United States Patent [19]

Kulpinski et al.

[11] Patent Number: 4,778,995

[45] Date of Patent: Oct. 18, 1988

[54] STIMULABLE PHOSPHOR IMAGING APPARATUS

[75] Inventors: Robert W. Kulpinski, Rochester; Anthony R. Lubinsky, Webster; James F. Owen, Rochester, all of N.Y.

[73] Assignee: Eastman Kodak Company, Rochester, N.Y.

[21] Appl. No.: 48,710

[22] Filed: May 12, 1987

[51] Int. Cl.$^4$ .................. A61B 6/00; G01N 23/04
[52] U.S. Cl. ........................ 250/327.2; 250/368
[58] Field of Search ............. 250/327.2, 489.1, 368

[56] References Cited

U.S. PATENT DOCUMENTS

| Re. 31,847 | 3/1985 | Luckey | 250/327.2 |
| 3,648,587 | 3/1972 | Stevens | 350/204 |
| 4,517,463 | 5/1985 | Gasiot et al. | 250/327.2 |
| 4,563,080 | 1/1986 | Ottley | 355/10 |
| 4,661,704 | 4/1987 | de Leeuw et al. | 250/327.2 |
| 4,691,232 | 9/1987 | Lange | 250/327.2 |

FOREIGN PATENT DOCUMENTS 1175647 10/1984 Canada .
1011252 11/1965 United Kingdom ............... 250/368

OTHER PUBLICATIONS

Laser-Stimulable Transparent CsI:Na Film for High Quality X-Ray Imaging Sensor, by Tsuyoshi Kano et al., Appl. Phys. Lett. 28 Apr. 1986.

Primary Examiner—Carolyn E. Fields
Attorney, Agent, or Firm—Thomas H. Close

[57] ABSTRACT

Apparatus for reading out an image stored in a transparent stimulable phosphor sheet includes means for maintaining a layer of optical index matching fluid between a light detector and the transparent stimulable phosphor sheet, to provide optical contact between the light detector and the transparent stimulable phosphor, means for scanning a beam of stimulating light in a line across the phosphor sheet, and means for providing relative movement between the transparent stimulable phosphor sheet and the light detector in a direction perpendicular to a scan line.

10 Claims, 8 Drawing Sheets

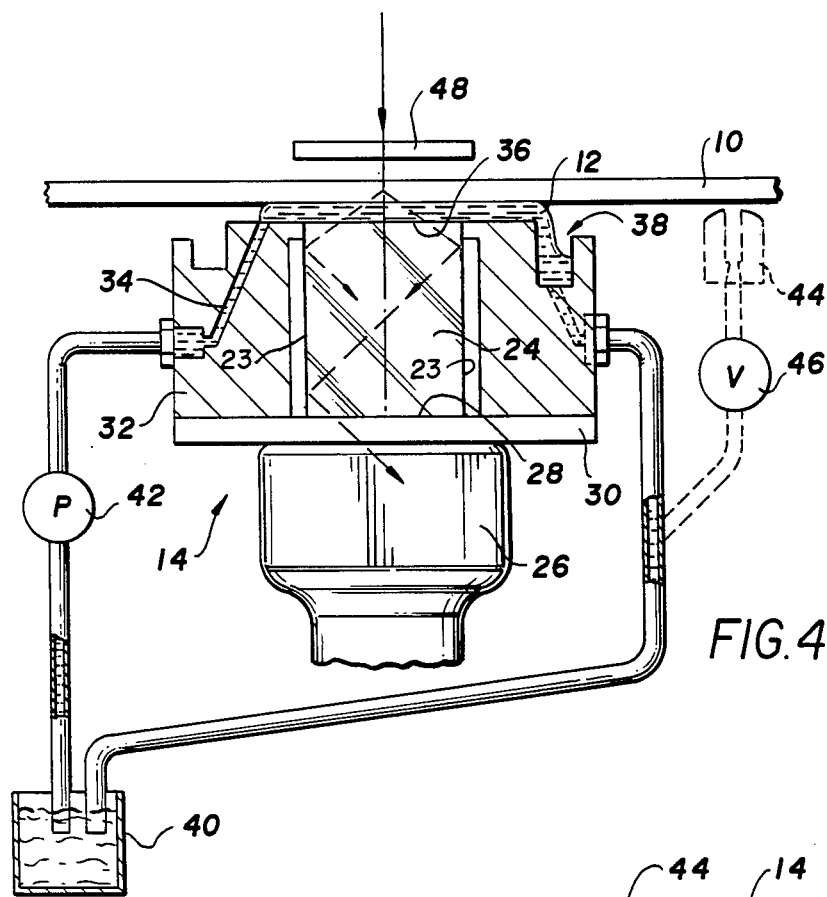
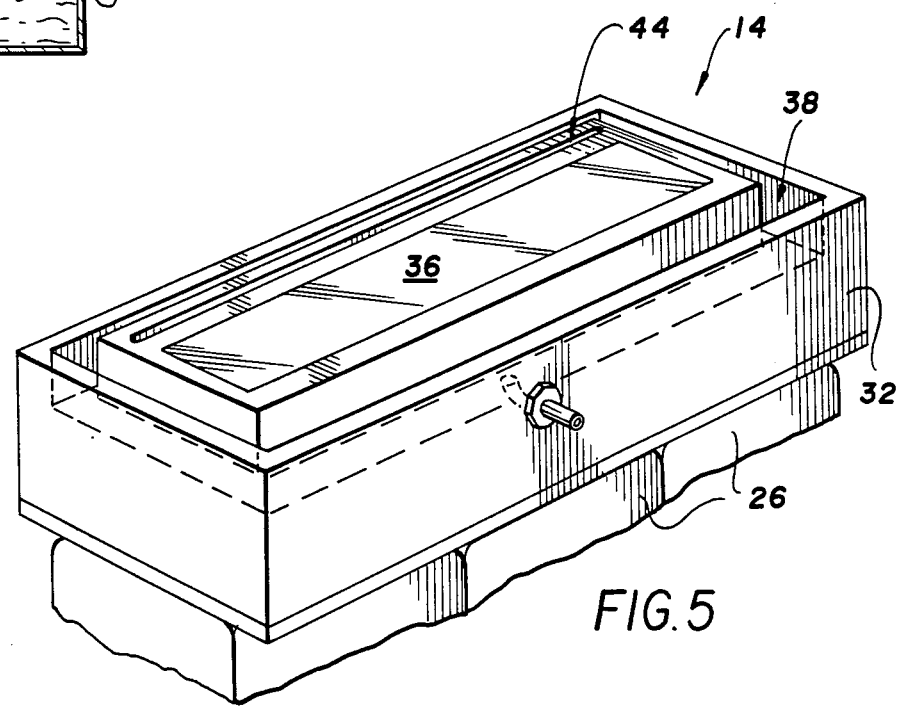

STIMULABLE PHOSPHOR IMAGING APPARATUS

TECHNICAL FIELD

The invention relates to apparatus for reading out the image stored in a photostimulable phosphor image recording medium, and more particularly to apparatus for detecting the radiation emitted from a transparent photostimulable phosphor sheet in response to interrogation by stimulating radiation.

BACKGROUND ART

In the photostimulable phosphor imaging system, as described in U.S. Pat. No. Re. 31,847 reissued Mar. 12, 1985 to Luckey, a photostimulable phosphor sheet is exposed to an imagewise pattern of high energy short wavelength radiation, such as x-radiation, to record a latent image pattern in the photostimulable phosphor sheet. The latent image is read out by stimulating the phosphor with a relatively long wavelength stimulating radiation, such as red or infrared light. Upon stimulation, the photostimulable phosphor releases emitted radiation of an intermediate wavelength, such as blue or violet light, in proportion to the quantity of short wavelength radiation that was received. To produce a signal useful in electronic image processing, the photostimulable phosphor sheet is scanned in a raster pattern by a beam of light produced for example by a laser deflected by an oscillating or rotating scanning mirror, and the emitted radiation is sensed by a photodetector such as a photomultiplier tube, to produce the electronic image signal.

In the conventional photostimulable phosphor imaging systems, the photostimulable phosphor sheet is turbid to both stimulating and emitted wavelengths of light. In such a turbid phosphor system, the minimum pixel size, and hence the resolution that can be achieved, corresponds to the scattered area of the scanning beam within the stimulable phosphor sheet itself. It has been proposed that the resolution of a photostimulable phosphor imaging system may be greatly improved by making the photostimulable phosphor sheet transparent, thereby enabling a reduction in the effective pixel size, since the apparent size of the beam is not increased by scattering. See for example, the article entitled "Laser-Stimulable Transparent CsI:Na Film for a High Quality X-ray Image Sensor" by Kano et al, Applied Physics Letters 48(17), Apr. 28, 1986. Since the MTF (Modulation Transfer Function—a measure of the ability of the system to record details) of the transparent photostimulable phosphor imaging system is limited mainly by the effective size of the scanning beam of stimulating radiation, the x-ray absorption of the sheet may be increased by making it thicker, without increasing the effective size of the scanning beam. In this way, the signal-to-noise ratio of the x-ray detector may be improved. In the conventional turbid phosphor sheets, the thickness was limited by the spreading of the scanning beam in the turbid phosphor. Unfortunately, the transparent photostimulable phosphor sheet has a drawback, in that a large fraction of the emitted light is totally internally reflected within the phosphor sheet and is not collected by conventional light detectors. The only emitted light that escapes from the surface of the photostimulable phosphor sheet is that which is emitted in the solid angle subtended by the light rays incident at less than a critical angle to the surface. For a transparent photostimulable phosphor sheet having an index of refraction of 1.6, this means that only about 11% of the light escapes from the top of the sheet, and another 11% from the bottom, the remainder of the light is trapped within the sheet by total internal reflection.

One solution to this problem is to employ a photostimulable phosphor sheet that comprises a photostimulable phosphor dispersed in a polymeric binder. The polymeric binder is selected such that its index of refraction matches that of the phosphor at the stimulating wavelength, but does not match that of the phosphor at the emitted wavelength. Thus, the emitted wavelength is scattered and is not trapped by total internal reflection, while the benefits of the transparent phosphor sheet are achieved for the stimulating wavelength. See Canadian Pat. No. 1,175,647 issued Oct. 9, 1984 to DeBoer & Luckey. Although this solution is ideal for a phosphor-binder type photostimulable medium, it does not solve the problem for an isotropic photostimulable medium such as the fused phosphor described in the above-referenced Kano et al article. Furthermore, even in a phosphor-binder type photostimulable medium, the desired indices of refraction are difficult to achieve in practice. A rapid change in the index of refraction of a material with changes in wavelength, which is necessary for the phosphor-binder system to be transparent to stimulating wavelength and turbid for the emitted wavelength of light, is generally associated with an absorption peak. Obviously, the presence of an absorption peak near the wavelengths of interest is to be avoided if maximum efficiency is to be achieved from the system.

It is therefore the object of the present invention to provide a light detector for use with a transparent photostimulable phosphor image recording medium having improved light collection efficiency.

DISCLOSURE OF THE INVENTION

The object is achieved according to the invention by providing a light detector comprising a light sensing means having a light receiving face, and means for making optical contact with one surface of the transparent phosphor sheet, and with the light receiving face of the light sensing means, to optically couple the light sensing means to the surface of the phosphor sheet, thereby preventing total internal reflection in the areas of optical contact. In one mode of practicing the invention, the optical coupling means comprises a light guide having an input face in optical contact with the surface of the transparent phosphor sheet, and an output face in optical contact with the light receiving face of the light sensing means. In a presently preferred mode, the light receiving face is a rectangular area having a long axis parallel to the direction of a scanning beam of stimulating radiation. Transport means are provided for relative movement between the phosphor sheet and the light detector in a direction perpendicular to the long axis of the light receiving face. Optical contact between the light receiving face and the phosphor sheet is provided by means for maintaining a layer of index matching fluid between the surface of the phosphor sheet and the input face of the light guide.

BRIEF DESCRIPTION OF THE DRAWINGS

The invention is described with reference to the drawings, wherein:

FIG. 4 is an end view of a light detector according to the preferred mode of practicing the invention;

FIG. 5 is a top perspective view of the light detector shown in FIG. 4;

MODES OF CARRYING OUT THE INVENTION

Figure 2:
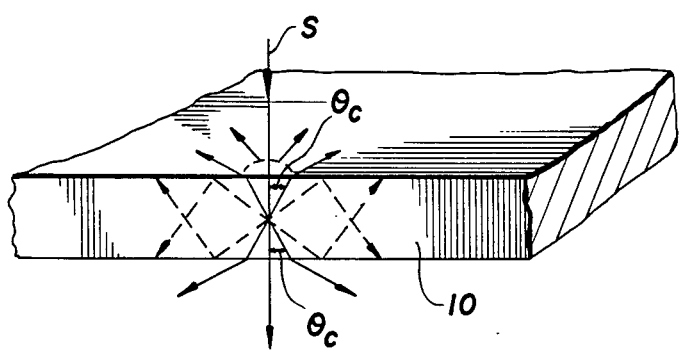
FIG. 2 is a schematic diagram useful in describing the background of the invention.
Figure 3:
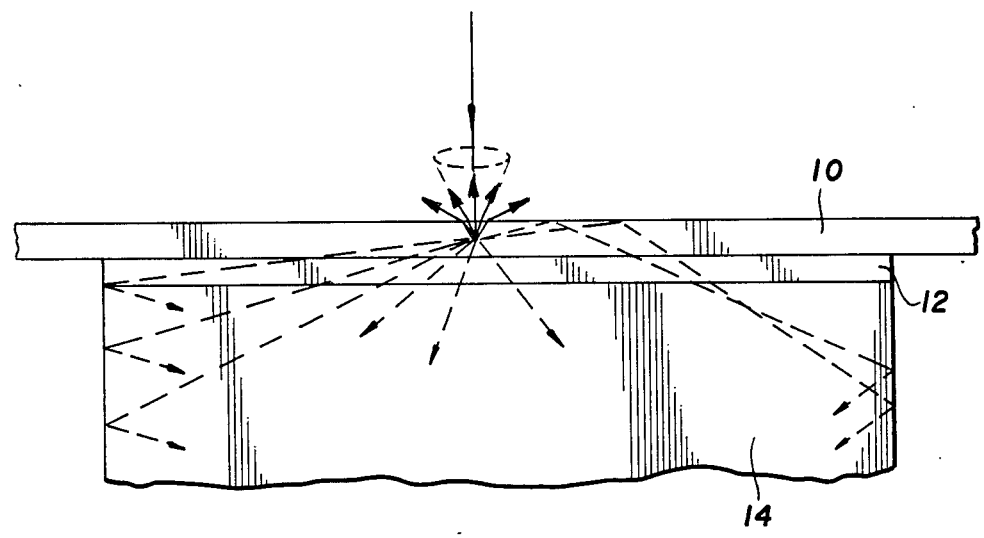
FIG. 3 is a schematic diagram illustrating the principle of operation of the present invention.

Before describing the preferred modes of carrying out the present invention, the principle of operation of the invention will be described with reference to FIGS. 2 and 3. FIG. 2 illustrates the effect of a scanning beam S on a transparent photostimulable phosphor sheet 10 having an index of refraction $n_p$ greater than 1. The scanning beam S stimulates the emmision of light in all directions within the phosphor sheet. Only the emitted light rays within a solid angle subtended by angle $\theta_c$ (illustrated by solid lines in FIG. 2) can escape from the surface of the transparent phosphor sheet 10. The rest of the rays (represented by phantom lines in FIG. 2) are trapped within the phosphor sheet by total internal reflection. The critical angle $\theta_c$ for total internal refraction is defined as:

$$\sin \theta_c = \frac{n_{air}}{n_p} \quad (1)$$

where $n_{air}$ is the index of refraction of air = 1. In terms of solid angle, the ratio $\epsilon$ (escape efficiency) of the light escaping from one side of the sheet to the total light emitted is expressed as $$\epsilon = 2\pi \left[ 1 - \left( 1 - \frac{1}{n_p^2} \right)^{\frac{1}{2}} \right] / 4\pi. \quad (2)$$

The total light energy from both the top and the bottom of the sheet is proportional to $2\epsilon$. For an index of refraction $n_p$ of 1.6, the escape efficiency is approximately 22%. Therefore, the fraction of light available for collection in a conventional light collector is 11% for collection from one side of the sheet, or 22% from both sides. A mirror can be placed on one side of the sheet and light collected from the other side of the sheet. In this case, the escape efficiency $\epsilon$ is:

$$\epsilon = \frac{1+R}{2} \left[ 1 - \left( 1 - \frac{1}{n_p^2} \right)^{\frac{1}{2}} \right] \quad (3)$$

where R is the reflectance of the mirror.

To increase the solid angle of collection from a stimulated area in the transparent phosphor, according to the present invention, a photosensor is optically coupled to the surface of the transparent phosphor. From equation (1) it is seen that by changing the index of refraction of the medium immediately adjacent the stimulable phosphor sheet to a material having an index more nearly matching that of the stimulable phosphor sheet, the critical angle $\theta_c$ can be made to approach 90°. FIG. 3 is a schematic diagram showing how the use of a layer of index matching material 12 that is in optical contact with the transparent phosphor sheet 10 and a light detector 14, increases the amount of light that arrives at the input face of the light detector.

Figure 1:
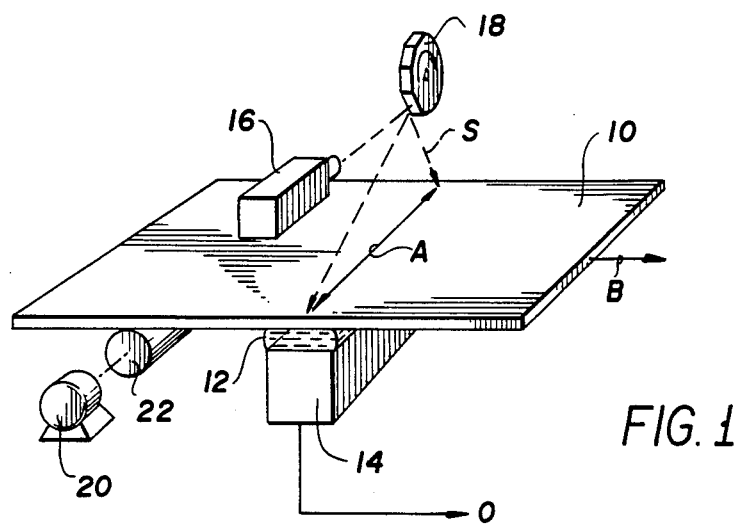
FIG. 1 is a schematic perspective view illustrating a light detector according to the present invention.

FIG. 1 is a schematic diagram illustrating apparatus according to the present invention. As shown in FIG. 1, a photostimulable phosphor sheet 10 is scanned by a beam of stimulating radiation S from a laser 16. The beam S is deflected in a fast or line scan direction as shown by arrow A by rotating polygon mirror 18. Laser scanners being well known in the art, focusing and field flattening optics present in the actual apparatus are not shown in the schematic diagram. The stimulable sheet is advanced in a slow or page scan direction as shown by arrow B by a sheet drive mechanism including a motor 20 and a drive roller 22. Light emitted from the stimulable phosphor sheet 10 is collected and detected by light detector 14 that is optically coupled to the bottom surface of the sheet by a layer of index matching material 12. The phosphor sheet 10 may be self-supporting, or may include a transparent substrate for support, such as glass (not shown). The light detector 14 senses the light emitted from the phosphor sheet 10 and produces an output signal O.

Referring now to FIG. 4, a preferred mode of maintaining a layer of index matching liquid between the light detector 14 and the phosphor sheet 10 will be described.

FIG. 4 is an end view of the light detector 14 which includes a transparent light guide 24 for conducting light emitted from stimulable phosphor sheet 10 to the input face of a sensing means such as a photomultiplier tube 26. The light guide 24 comprises a block of transparent material having reflective side walls 23 achieved, for example by a dielectric or metalized coating on the sides of the transparent block. The bottom face 28 of the transparent light guide 24 is in optical contact with a band pass optical filter 30. The filter 30 is in turn, in optical contact with the light receiving face of the photomultiplier tube 26. The bandpass optical filter 30 passes light of the emitted wavelength and absorbs light of the stimulating wavelength to keep the stimulating light from being detected by the photomultiplier 26.

The transparent light guide 24 is held in a frame 32 which defines a passage 34 for introducing a layer 12 of index matching liquid between the upper face 36 of the transparent light guide 24 and the bottom surface of the phosphor sheet 10. The frame 32 also defines a trough 38 surrounding the top of the light guide 24 for catching the index matching liquid and returning it to a sump 40. A pump 42 recirculates the liquid to the passage 34. In operation, the pump 42 continuously recirculates the index matching liquid in a laminar flow between the upper surface 36 of the light guide and the phosphor sheet 10, while the phosphor sheet is transported past the light detector 14.

FIG. 5 is a top perspective view of the light detector 14. As can be seen in FIG. 5, the opening from passage 34 is a slot 44 that runs parallel to the edge of the light guide surface 36.

Optionally, depending upon the adhesion characteristics of the index matching liquid to the surface of the phosphor sheet, a vacuum skive 44 (shown in phantom) is provided to remove any excess index matching liquid that is carried past the light detector 14 on the underside of the phosphor sheet 10. The index matching liquid removed from the underside of the sheet is conducted through a vacuum pump 46 back into sump 40.

Figure 6:
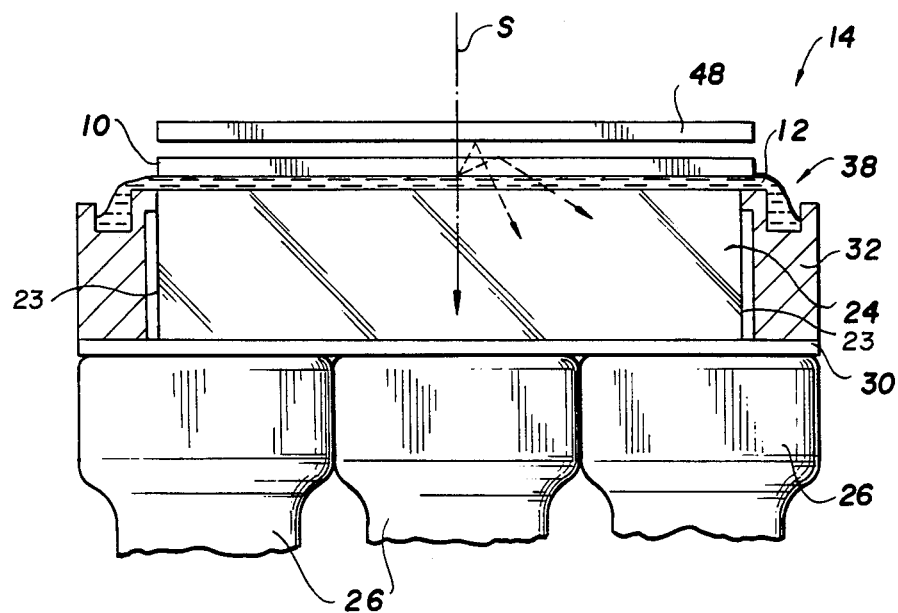
FIG. 6 is a side view of the light detector shown in FIG. 4.

FIG. 6 is a side view of the light detector 14 of FIG. 4, showing a dichroic filter 48 for passing the beam S of stimulating radiation and reflecting any emitted radiation that escapes internal reflection in the phosphor sheet 10. This dichroic filter 43 may be coated directly onto the surface of the phosphor sheet or may comprise a separate filter that is spaced from and supported above the sheet 10.

Ideally, for the maximum escape efficiency, and therefore the maximum light collection efficiency, the index of refraction of the index matching liquid is equal to that of the stimulable phosphor. However, index matching liquid having a lower index of refraction still yields significant improvements in escape efficiency. For example, for water, with an index of refraction of 1.33 and a transparent phosphor sheet having an index of refraction of 1.6, the escape efficiency is 44%. For Isopar TM fluorocarbon liquid, with an index of refraction of 1.4, the escape efficiency is 55%, and for mineral oil having an index of refraction of 1.5, the escape efficiency is 65%. These escape efficiencies are compared with 22% escape efficiency with no optical contact between the detector and the phosphor sheet.

Figure 7:
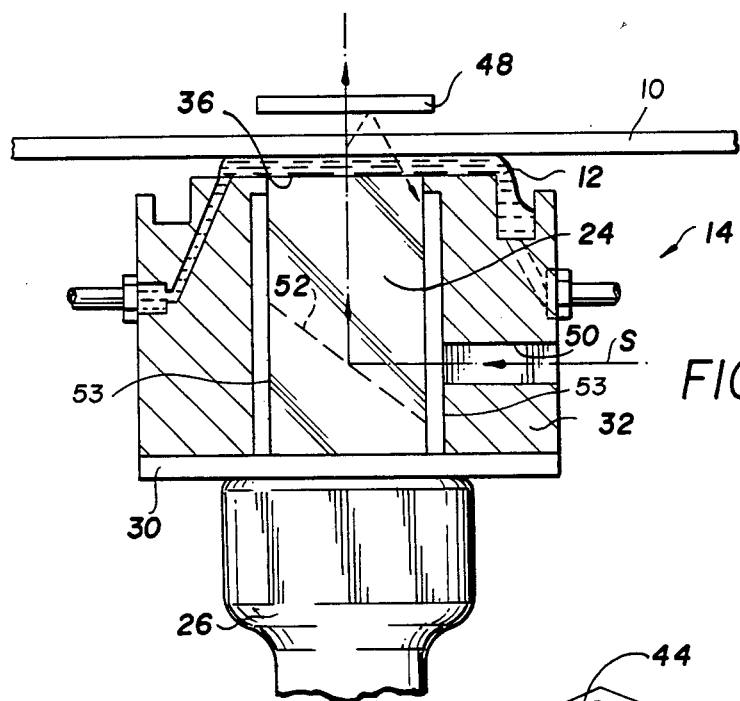
FIG. 7 is an end view of a light detector according to an alternative mode of practicing the invention, wherein the scanning beam is introduced through a light guide.

FIG. 7 shows a light detector 14 according to an alternative mode of carrying out the present invention, wherein a scanning beam S is introduced from the underside of the phosphor sheet through a slot 50 in the side of the frame 32 holding light guide 24. The light guide includes a dichroic mirror 52 for deflecting the beam of stimulating radiation S to the phosphor sheet 10 and passing the emitted light to the photomultiplier tube 26. The sides 53 of the light guide are provided with reflective coatings, such as dielectric or metal coatings to reflect the emitted light. A window in the coating is provided for the scanning beam S. The means for maintaining a layer of index matching fluid 12 between the top surface 36 of the light guide 24 and the bottom of the phosphor sheet 10 is the same as described above with reference to FIG. 4. As an alternative to a dichroic mirror 48 for passing the scanning beam and reflecting emitted light, a broad band reflective surface may be employed, thereby reflecting the scanning beam S back for a second pass through the photostimulable phosphor and enabling a lower stimulating beam power to be employed.

Figure 8:
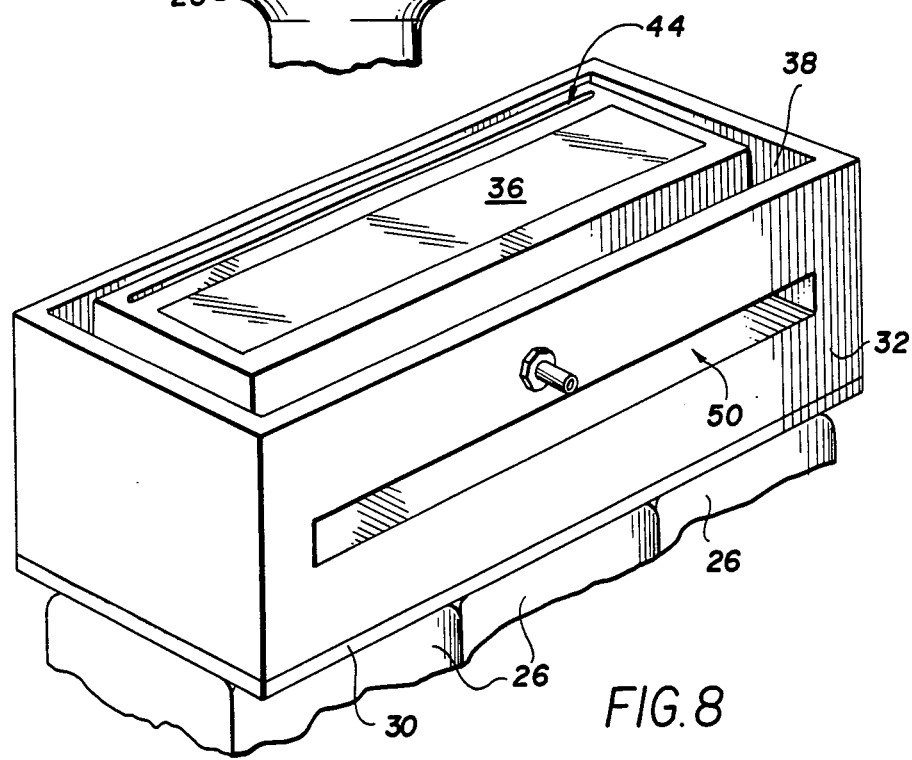
FIG. 8 is a top perspective view of the light detector shown in FIG. 8.

FIG. 8 is a top perspective view of the light detector shown in FIG. 7, illustrating the slot 50 in frame 32 for introducing the beam of stimulating radiation.

Figure 9:
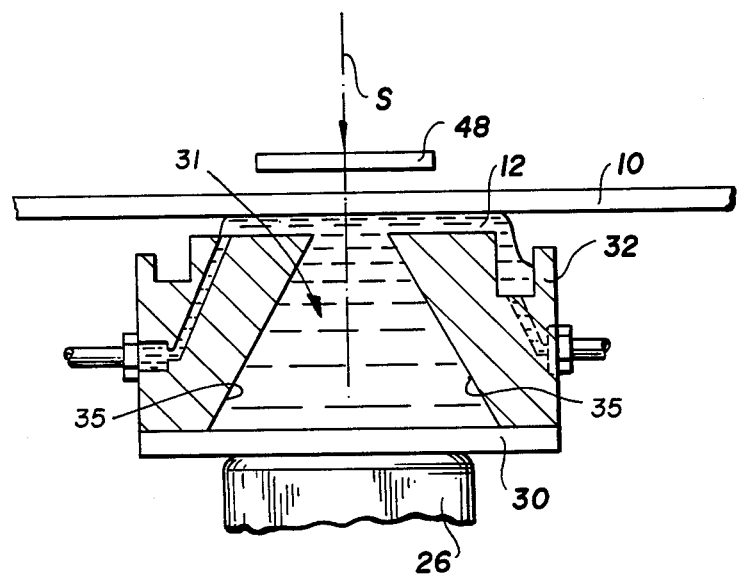
FIG. 9 is an end view of a light detector according to an alternative mode of the present invention, wherein the light guide is filled with index matching fluid.

According to a further modification of the light detector, the light guide 24 is replaced by a fluid filled cavity 31 having reflective internal surfaces 35 as shown in FIG. 9. Also, as shown in FIG. 9, the walls 35 of the fluid filled cavity may be tapered to slope away from the light entrance to the cavity thereby improving the collection efficiency of the light detector. In a similar manner, the light guides of FIGS. 4 and 7 may also be tapered to improve collection efficiency.

Figure 10:
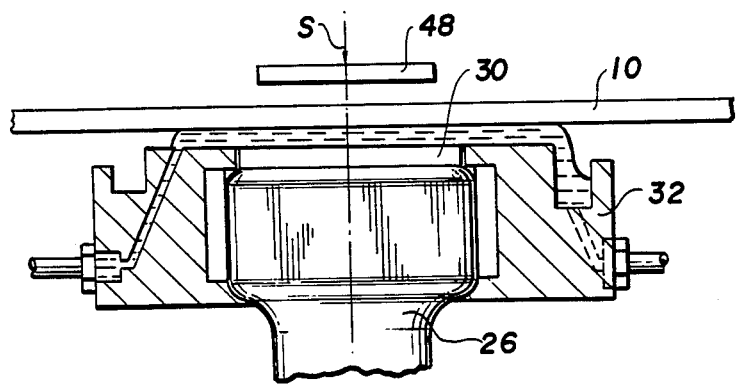
FIG. 10 is an end view of a light detector wherein the light sensor is in direct optical contact with the phosphor sheet.

The light guide or fluid filled chamber in FIGS. 4, 7 and 9, tend to act as light diffusing chambers so that the response of the light detector is uniform across the width of the line scan. In applications where the uniformity of response is not a critical factor, the light guide itself may be eliminated and the face of the photomultiplier tubes, or the filter 30, coupled directly to the bottom surface of the phosphor as shown in FIG. 10.

Figure 11:
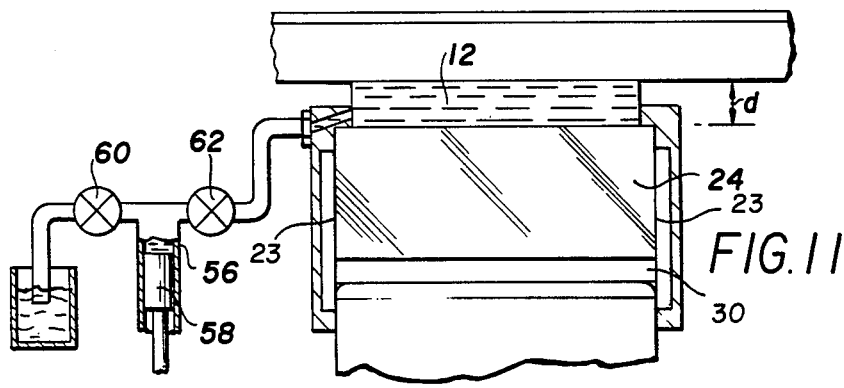
FIG. 11 is an end view of a light detector according to an alternative mode of practicing the invention.

FIG. 11 is an end view of apparatus according to another mode of practicing the invention wherein the layer of fluid between the phosphor sheet 10 and the light detector 14 is maintained by fluid forces rather than by a continuous flow of fluid as in the previous examples. In the arrangement shown in FIG. 11, the stimulable phosphor sheet 10 is supported at a predetermined distance d from the light guide 24. A predetermined quantity of index matching fluid 12 is delivered between the light detector 14 and the phosphor sheet 10 by a metering cylinder 56 and piston 58 disposed between two valves 60 and 62. In operation, valve 60 is open and valve 62 is closed with the piston at the top of the cylinder. The piston is withdrawn to charge the cylinder with a predetermined volume of index matching fluid. Valve 60 is closed and valve 62 is opened and the piston is raised in the cylinder to introduce the predetermined charge of index matching fluid into the gap between the phosphor sheet and the light detector. The quantity of index matching fluid is such that surface tension forces retain the index matching fluid in the desired region between the detector and the phosphor sheet.

Figure 12:
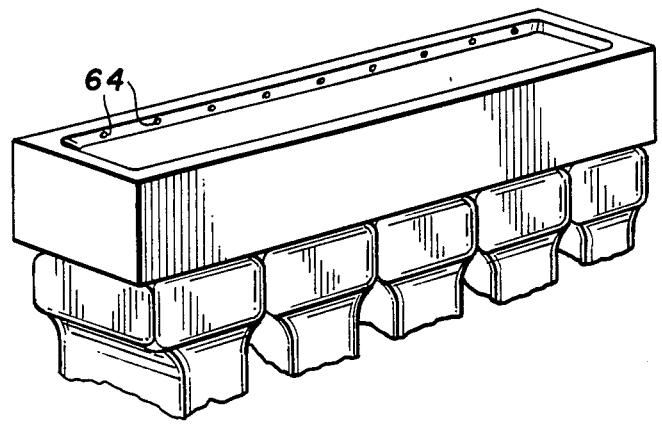
FIG. 12 is a top perspective view of the light detector shown in FIG. 11.

FIG. 12 shows a top perspective view of the light detector shown in FIG. 11. The index matching liquid is introduced through a row of orifices 64 leading from a manifold (not shown).

Figure 13:
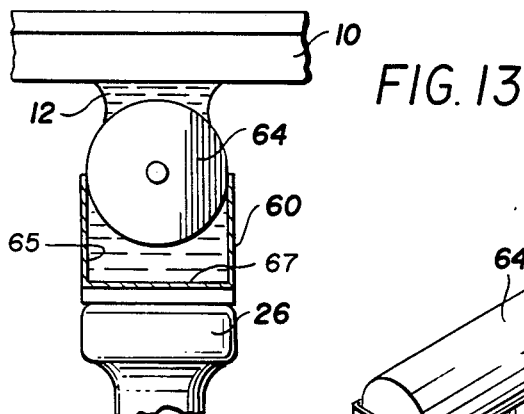
FIG. 13 is an end view of a light detector according to an alternative mode of practicing the present invention.

Apparatus according to a further mode of practicing the invention is shown in FIG. 13. As shown an end view in FIG. 13, a transparent roller 64 is rotatably supported in a trough 66 of index matching fluid. The trough 66 has reflective coatings on its inside walls 65 and a transparent bottom 67 and in cooperation with roller 64, serves as the light guide. A row of light sensors such as photomultiplier tubes 26 are arranged along the bottom of trough 66 in optical contact therewith. The transparent roller 64 carries a layer of index matching liquid 12 to the bottom surface of the phosphor sheet 10. Surface tension maintains a meniscus of index matching liquid 12 between the roller and the bottom surface of the phosphor sheet 10.

Figure 14:
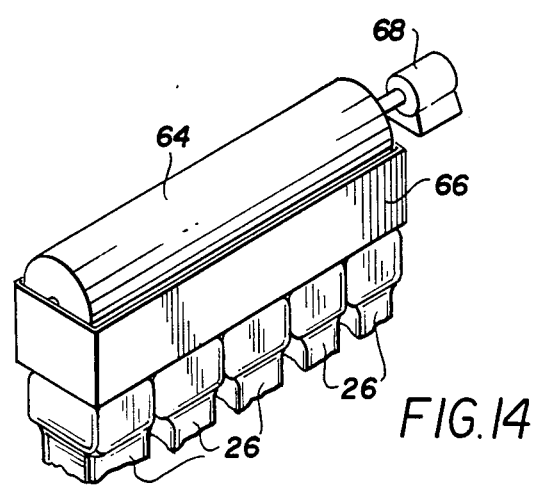
FIG. 14 is a top perspective view of the light detector shown in FIG. 13.

FIG. 14 is a top perspective view of the light detector as shown in FIG. 13. Means such as a motor 68 may be provided to rotate the roller 64 to move at the same speed as the phosphor sheet 10. The phosphor sheet may be bent over the roller 64 to increase the area of optical contact with the roller.

Figure 15:
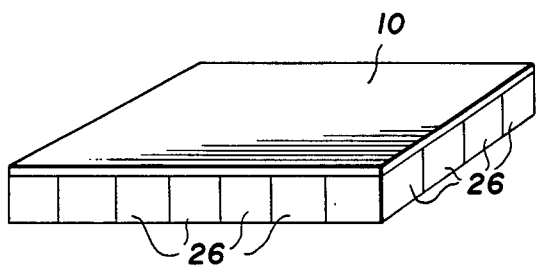
FIG. 15 is a top perspective view of a light detector according to an alternative mode of practicing the present invention.

In the modes described above, the transparent phosphor sheet was translated with respect to the light detector. The principle of the present invention may also be applied to apparatus where the light detector is fixed with respect to the phosphor sheet. FIG. 15 shows such an arrangement wherein an array of light sensors 26 are arranged in optical contact with the backside of the phosphor sheet 10. Optical contact can be provided by a layer of index matching liquid as in the previous modes, or a layer of optical cement, since there is no relative movement between the phosphor sheet 10 and the light sensors 26.

Figure 16:
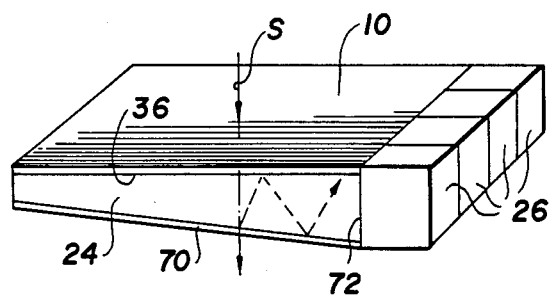
FIG. 16 is a top perspective view of an alternative mode of practicing the present invention wherein a wedge-shaped light guide has one surface in optical contact with the photostimulable phosphor.

FIG. 16 shows apparatus according to a mode wherein a wedge-shaped transparent light guide 24 has one face 36 in optical contact with the transparent phosphor sheet 10. An opposite face of the wedge-shaped light guide 24 is provided with a dichroic filter 70 which passes the stimulating light as shown by the solid line and reflects the emitted light shown by the phantom line, to a row of light sensors 26 in optical contact with the base 72 of the wedge-shaped light guide 24. The other faces of the light guide 24 are coated with a reflective coating.

Figure 17:
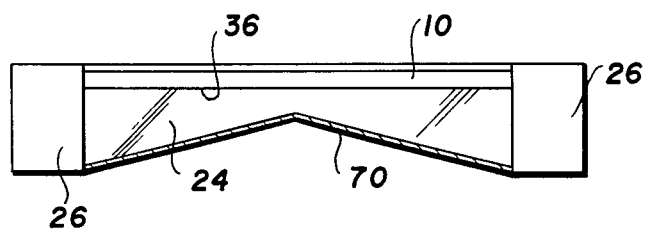
FIG. 17 is an end view of a light detector according to an alternative mode of practicing the present invention.

FIG. 17 is a side view of an apparatus according to a mode similar to the apparatus shown in FIG. 16, having a row of light sensors 26 arranged on two edges of the light guide 24. The top surface 36 of the light guide 24 is in optical contact with the phosphor sheet 10, and the light receiving faces of the light sensors 26 are in optical contact with the edges of light guide 24.

Figure 18:
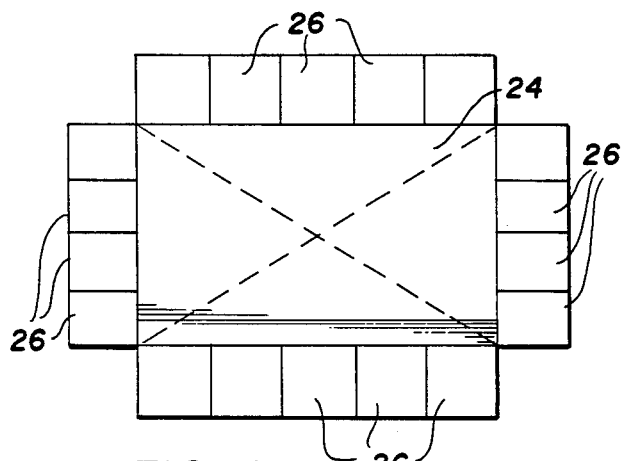
FIG. 18 is a top view of a light detector according to an alternative mode of practicing the present invention.

FIG. 18 is a top view of apparatus according to a further mode of the invention wherein light sensors 26 are arranged on all four sides of a light guide 24.

Figure 19:
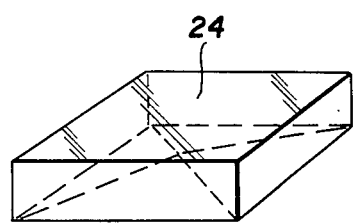
FIG. 19 is a perspective view of the light guide shown in FIG. 18.

FIG. 19 is a perspective view of the light guide 24 showing how the light guide tapers toward all four edges.

Industrial Applicability and Advantages

The light detector according to the present invention is useful in x-ray imaging apparatus of the type employing a transparent photostimulable phosphor. The light detector is advantageous in that the light collection efficiency of the light detector is much higher than detectors of the prior art, thereby permitting the advantages inherent in a transparent photostimulable phosphor system to be realized.

We claim:

1. Stimulable phosphor imaging apparatus, comprising:
    (a) a transparent stimulable phosphor sheet for storing a radiation image, and emitting light in an image wise pattern upon stimulation, a portion of the emitted light being trapped in said transparent stimulable phosphor sheet by total internal reflection;
    (b) means for sensing light emitted by said transparent stimulable phosphor sheet and generating an electrical signal in response thereto, said sensing means having a light receiving face; and
    (c) means for making optical contact between one surface of said transparent stimulable phosphor sheet, and said light receiving face to optically couple said sensing means to said one surface of said transparent stimulable phosphor sheet in such a manner to release emitted light trapped by total internal reflection.

2. The apparatus claimed in claim 1, wherein said means for making optical contact comprises a light guide having an input face and an output face, means for making optical contact between said input face and said one surface of said phosphor sheet, and means for making optical contact between said output face and said light receiving face of said sensing means.

3. The apparatus claimed in claim 2, wherein said means for making optical contact between said input face of said light guide and said one surface of said phosphor sheet comprises means for maintaining a layer of optical index matching liquid between said input face and said one surface.

4. The apparatus claimed in claim 3, further comprising:
    (a) means for scanning a beam of stimulating light in a line across said phosphor sheet, and wherein said input face of said light guide defines a rectangular strip extending in a direction parallel to the direction of the scan line of said stimulating radiation; and
    (b) means for providing relative movement between said phosphor sheet and said light receiving face of said light guide.

5. The apparatus claimed in claim 4, wherein said means for maintaining a layer of optical index matching liquid includes:
    (a) a slot for introducing a laminar flow of index matching liquid between said sheet and said light receiving face of said guide,
    (b) a sump for collecting liquid that has passed between said light receiving face and said surface of said phosphor sheet, and
    (c) a recirculating pump for recirculating liquid from said sump to said slot.

6. The apparatus claimed in claim 5, wherein said light guide comprises a rectangular block of transparent material, the input face comprising one side of the block and the output face comprising an opposite side of the block, the other surfaces of the block being covered with a reflective coating.

7. The apparatus claimed in claim 5, wherein said light guide comprises a mirror box filled with index matching liquid, the input face comprising an open top of the box, and the output face comprising the bottom of the box covered by said light receiving face of said light sensing means.

8. The apparatus claimed in claim 1, wherein said means for making optical contact comprises means for maintaining a layer of optical index matching liquid between said light receiving face and said one surface of said phosphor sheet.

9. The apparatus claimed in claim 2, wherein said light guide comprises a wedge of transparent material, one side of said wedge comprising said input face, and the base of said wedge comprising said output face, said input face being substantially coextensive with said phosphor sheet.

10. The apparatus claimed in claim 9, further including an optical filter on a face of said light guide opposite said input face for passing stimulating radiation and reflecting emitted radiation.

* * * * *